United States Patent
Breznova et al.

(10) Patent No.: US 7,760,488 B2
(45) Date of Patent: Jul. 20, 2010

(54) SINTERED ANODE PELLET TREATED WITH A SURFACTANT FOR USE IN AN ELECTROLYTIC CAPACITOR

(75) Inventors: Hana Breznova, Vsetin (CZ); Martin Biler, Novy Jicin (CZ)

(73) Assignee: AVX Corporation, Myrtle Beach, SC (US)

( * ) Notice: Subject to any disclaimer, the term of this patent is extended or adjusted under 35 U.S.C. 154(b) by 239 days.

(21) Appl. No.: 12/017,481

(22) Filed: Jan. 22, 2008

(65) Prior Publication Data

US 2009/0185941 A1    Jul. 23, 2009

(51) Int. Cl.
*H01G 9/04* (2006.01)
*H01G 9/145* (2006.01)

(52) U.S. Cl. .................. 361/528; 29/25.03; 361/524

(58) Field of Classification Search ............... 29/25.03; 361/528–529, 532
See application file for complete search history.

(56) References Cited

U.S. PATENT DOCUMENTS

| | | | |
|---|---|---|---|
| 3,345,545 A | 10/1967 | Bourgault et al. | |
| 4,084,965 A | 4/1978 | Fry | |
| 4,085,435 A | 4/1978 | Galvagni | |
| 4,118,727 A | 10/1978 | Laplante | |
| 4,131,520 A * | 12/1978 | Bernard et al. | 205/171 |
| 4,149,876 A | 4/1979 | Rerat | |
| 4,155,017 A | 5/1979 | Gaule et al. | |
| 4,278,513 A * | 7/1981 | Millard et al. | 205/171 |
| 4,412,902 A | 11/1983 | Michikami et al. | |
| 4,672,267 A | 6/1987 | Lapatovich et al. | |
| 4,712,857 A | 12/1987 | Lee | |
| 4,722,756 A | 2/1988 | Hard | |
| 4,892,862 A | 1/1990 | Ogushi et al. | |
| 4,945,452 A | 7/1990 | Sturmer et al. | |
| 4,957,541 A | 9/1990 | Tripp et al. | |
| 5,098,485 A | 3/1992 | Evans | |
| 5,198,187 A | 3/1993 | Lu et al. | |
| 5,198,968 A | 3/1993 | Galvagni | |
| 5,306,479 A | 4/1994 | Sommers | |
| 5,357,399 A | 10/1994 | Salisbury | |
| 5,391,269 A | 2/1995 | Fiering et al. | |
| 5,394,295 A | 2/1995 | Galvagni et al. | |

(Continued)

FOREIGN PATENT DOCUMENTS

CN    1549286    11/2004

(Continued)

OTHER PUBLICATIONS

Abstract of Canadian Patent No. CA 2 018 346 dated Dec. 8, 1990.

(Continued)

*Primary Examiner*—Eric Thomas
(74) *Attorney, Agent, or Firm*—Dority & Manning, P.A.

(57) ABSTRACT

An electrolytic capacitor anode treated with a surfactant during anodic oxidation is provided. Without intending to be limited by theory, it is believed that the surfactant may lower the surface tension of an electrolyte, which inhibits the clustering of grown oxides and allows the dielectric layer to become more homogeneous and uniformly spread over the anode body. The resulting dielectric layer may thus have a substantially homogeneous thickness, smooth surface, and improved leakage current stability.

31 Claims, 8 Drawing Sheets

U.S. PATENT DOCUMENTS

| | | | |
|---|---|---|---|
| 5,457,862 | A | 10/1995 | Sakata et al. |
| 5,473,503 | A | 12/1995 | Sakata et al. |
| 5,495,386 | A | 2/1996 | Kulkarni |
| 5,729,428 | A | 3/1998 | Sakata et al. |
| 5,812,367 | A | 9/1998 | Kudoh et al. |
| 5,949,639 | A | 9/1999 | Maeda et al. |
| 5,993,513 | A | 11/1999 | Fife |
| 6,051,044 | A | 4/2000 | Fife |
| 6,072,694 | A | 6/2000 | Hahn et al. |
| 6,115,235 | A | 9/2000 | Naito |
| 6,165,623 | A | 12/2000 | Fife et al. |
| 6,191,936 | B1 | 2/2001 | Webber et al. |
| 6,197,252 | B1 | 3/2001 | Bishop et al. |
| 6,312,642 | B1 | 11/2001 | Fife |
| 6,322,912 | B1 | 11/2001 | Fife |
| 6,334,945 | B1 | 1/2002 | Lessner et al. |
| 6,338,816 | B1 | 1/2002 | Fife |
| 6,373,685 | B1 | 4/2002 | Kimmel et al. |
| 6,375,704 | B1 | 4/2002 | Habecker et al. |
| 6,391,275 | B1 | 5/2002 | Fife |
| 6,402,066 | B1 | 6/2002 | Habecker et al. |
| 6,416,730 | B1 | 7/2002 | Fife |
| 6,420,043 | B1 | 7/2002 | Fife et al. |
| 6,455,443 | B1 | 9/2002 | Eckert et al. |
| 6,462,934 | B2 | 10/2002 | Kimmel et al. |
| 6,517,645 | B2 | 2/2003 | Fife |
| 6,522,527 | B2 | 2/2003 | Kojima et al. |
| 6,527,937 | B2 | 3/2003 | Fife |
| 6,563,695 | B1 | 5/2003 | Suzuki et al. |
| 6,576,099 | B2 | 6/2003 | Kimmel et al. |
| 6,592,740 | B2 | 7/2003 | Fife |
| 6,616,728 | B2 | 9/2003 | Fife |
| 6,639,787 | B2 | 10/2003 | Kimmel et al. |
| 6,674,635 | B1 | 1/2004 | Fife et al. |
| 6,702,869 | B2 | 3/2004 | Habecker et al. |
| 6,706,240 | B2 | 3/2004 | Habecker et al. |
| 6,759,026 | B2 | 7/2004 | Kimmel et al. |
| 6,821,314 | B1 | 11/2004 | Reichert et al. |
| 6,835,225 | B2 | 12/2004 | Naito et al. |
| 7,025,795 | B2 | 4/2006 | Monden et al. |
| 7,116,548 | B2 | 10/2006 | Satterfield, Jr. et al. |
| 7,149,074 | B2 | 12/2006 | Kimmel et al. |
| 7,156,893 | B2 | 1/2007 | Habecker et al. |
| 7,157,073 | B2 | 1/2007 | Motchenbacher et al. |
| 7,218,505 | B2 | 5/2007 | Naito et al. |
| 7,220,397 | B2 | 5/2007 | Kimmel et al. |
| 7,241,436 | B2 | 7/2007 | Fife |
| 7,262,511 | B2 | 8/2007 | Osako et al. |
| 7,289,314 | B2 | 10/2007 | Kobyayashi et al. |
| 2003/0104923 | A1* | 6/2003 | Omori et al. .............. 501/134 |
| 2005/0013765 | A1 | 1/2005 | Thomas et al. |
| 2005/0019581 | A1 | 1/2005 | Schnitter |
| 2005/0103638 | A1 | 5/2005 | Schnitter et al. |
| 2005/0150576 | A1 | 7/2005 | Venigalla |
| 2005/0199321 | A1 | 9/2005 | Spaniol |
| 2007/0072362 | A1 | 3/2007 | Tseng et al. |
| 2007/0121276 | A1 | 5/2007 | Uzawa et al. |
| 2007/0137434 | A1 | 6/2007 | Omori et al. |

FOREIGN PATENT DOCUMENTS

| | | |
|---|---|---|
| EP | 1591564 A2 | 11/2005 |
| EP | 1591564 A3 | 11/2005 |
| GB | 2371811 A | 8/2002 |
| JP | 62268121 A * | 11/1987 |
| JP | 09306792 A * | 11/1997 |
| SU | 1057995 A | 11/1983 |
| WO | WO 9738143 A1 | 10/1997 |
| WO | WO 9819811 A1 | 5/1998 |
| WO | WO 9838660 A1 | 9/1998 |
| WO | WO 0060620 A1 | 10/2000 |
| WO | WO 2005076297 A1 | 8/2005 |
| WO | WO 2006054795 A1 | 5/2006 |
| WO | WO 2007020458 A1 | 2/2007 |
| WO | WO 2007020464 A1 | 2/2007 |
| WO | WO 2007026165 A1 | 3/2007 |

OTHER PUBLICATIONS

Abstract of Japanese Patent No. JP1176226 dated Jul. 12, 1989.
Abstract of Japanese Patent No. JP2038501 dated Feb. 7, 1990.
Abstract of Japanese Patent No. JP3023222 dated Jan. 31, 1991.
Abstract of Japanese Patent No. JP4070594 dated Mar. 5, 1992.
*Adsorption of Gases in Multimolecular Layers*, Brunauer et al., The Journal of the American Chemical Society, vol. 60, Feb. 1938, pp. 309-319.
*Change in Porous Structure and Leakage Currents of Niobium Capacitor Anodes During Electrolytic Oxidation*, Levinskiy, et al., Poroshkovaya Metallurgiya, No. e, 1991, pp. 56-59.
*Charge Carrier Transport and Storage in NbO Capacitors*, Sikula et al., Carts Europe, Oct. 21, 2004, 4 pages.
*Conductivity Mechanisms and Breakdown Characteristics of Niobium Oxide Capacitors*, Hlavka et al., AVX Corporation 2003, 5 pages.
*Conductivity Mechanisms and Breakdown of NbO Capacitors*, Hlavka et al., Carts USA, Mar. 19, 2004, 7 pages.
*Dynamic Phenomena in Superconducting Oxides Measured by ESR*, Acrivos et al., Physical Review B, vol. 50, No. 18, Nov. 1, 1994, pp. 13.710-13.723.
*Dynamics of Flux Motion Observed by ESR in Superconducting Oxides*, Acrivos et al., Physics C 235-240, 1994, pp. 3159-3160.
*Electrical Conductivity in Ceramics and Glass*, Vest et al., Department of the Air Force, Aerospace Research Laboratories, Wright-Patterson Air Force Base, OH., 1974, pp. 375-384.
*Electrochemical characterization of a polypyrrole/$Co_{0.2}CrO_x$ composite as a cathode material for lithium ion batteries*, Ramasamy et al., Journal of Power sources 124, 2003, pp. 197-203.
*Electrolytic Capacitors*, Electrochemical Society Reviews and News, vol. 24, No. 12, Dec. 1977, pp. 408C-409-C.
Encyclopedia of Chemical Technology entitled *Nickel and Nickel Alloys to Paint*, vol. 17, $4^{th}$ Edition, pp. 59 and 65-66.
*Extended Range NbO Capacitors Through Technology and Materials Enhancements*, Zednicek, et al., Carts USA, Mar. 24, 2005, 5 pages.
*General Characteristics of the Film-Forming Metals: The Relation Between Overpotential and the Fields in the Oxide and Across the Interfaces*, Young, Chapter 2, pp. 4-5.
*Growth of thin-film niobium oxide layers by molecular-beam epitaxy*, Petrucci et al., J. Appl. Phys. 63(3), Feb. 1, 1988, pp. 900-909.
*Heat Field Stability and Crystallization Peculiarities of Amorphous $Nb_2O_5$ Films*, Palatnik et al., Fizika I Khimiya Obrabotki Materialov, No. 5, 1982, pp. 87-94.
*High-Capacitance Supercapacitor Using a Nanocomposite Electrode of Single-Walled Carbon Nanotube and Polypyrrole*, An et al., Journal of The Electrochemical Society, vol. 149, No. 8, 2002, pp. A1058-A1062.
*Investigation of Columbium as an Electrolytic Capacitor Anode, Part II*, Peabody, U.S. Army Signal Research and Development Laboratory, Fort Monmouth, NJ, DA Task Nr. 3a99-15-003-04, 1962, pp. 1-11.
*Low ESR and Low Profile Technology on Niobium Oxide*, Zednicek et al., AVX Corporation 2003, 9 pages.
*Mechanism of leakage current reduction of tantalum oxide capacitors by titanium doping*, Lau et al., Applied Physics Letters 90, 2007, pp. 112903-1-112903-3.
*NbO Capacitor Parameters Improvement, Leakage Current Mechanism and Anodic Oxidation*, Sikula et al., Mar. 30, 2005, 7 pages.
*New Tantalum Technologies, Tantalum Polymer, and Niobium Oxide Capacitors*, T. Zedníček, Carts Europe Prague, Oct. 19, 2005, 7 pages.
*Niobium Compounds and Alloys*, J. Eckert, Int. J. of Refractory Metals & Hard Materials, vol. 12, 1993-1994, pp. 335-340.
*Niobium Oxide and Tantalum Capacitors: M-I-S Model Parameters Comparison*, Sikula et al., Carts USA, Mar. 24, 2005, 4 pages.

*Niobium Oxide set to beat the pants off tants*, CIE (Components in Electronics), Aug. 2007.
*Niobium Oxide Technology Roadmap*, Zednicek et al., AVX Corporation, T. Zednicek et al., Carts Europe Nice, Oct. 15, 2002, 5 pages.
*Niobium Physico-Chemical Properties of Its Compounds and Alloys*, Feschotte et al., International Atomic Energy Review, Special Issue No. 2, 1968, pp. 56-59.
*Niobium Solid Electrolytic Capacitors*, Schwartz et al., Journal of the Electrochemical Society, vol. 108, No. 8, Aug. 1961, pp. 750-757.
*Note on the Crystal Structure of Niobium Dioxide*, Magneli et al., Acta Chem. Scand. 9, No. 8, 1955.
*Oxidative coupling of methane over NbO (p-type) and $Nb_2O_5$ (n-type) semiconductor materials*, Erarslanoglu et al., Catalysis Letters 38, 1996, pp. 215-218.
*Phosphoric Acid Passivated Niobium and Tantalum EIS-Comparative Study*, Al-Kharafi et al., Electrochimica Acta, vol. 40, No. 16, 1995, pp. 2623-2626.
*Preparation and Chlorination of $NbO_2$ and NbO and NbC*, Baba et al., Journal of Mining and Metallurgical Inst. of Japan, vol. 82, No. 942, 1966, pp. 855-860.
*Quality of Niobium Oxide Semiconductor Capacitors as a Function of Chemical Composition of the Niobium Powder*, Bord et al., No. 1 (46), 1982, pp. 11-15.
*Study of NbO by neutron diffraction of inelastic scattering of neutrons*, V. V. Sumin, Sov. Phys. Crystallogr. 34(3), May-Jun. 1989, pp. 391-393.
*Study of Oxygen Solubility in Niobium*, Orlov et al., Izvestiya Akademii Nauk SSSR, Metally, No. 5, 1985, pp. 202-205.
*Superconductivity in the System Ln-Sr-Nb-O (Ln = La, Nd, Gd, Dy, Tm, Lu)*, Kuz'micheva et al., Russian Journal of Inorganic Chemistry, vol. 38, No. 1, 1993, pp. 149-153.
*The crystal structure of niobium monoxide*, Bowman et al., Los Alamos Scientific Laboratory, University of California, Los Alamos, NM, Jun. 4, 1966.
*The Formation of the Lower Oxides of Niobium and Tantalum in Some Reactions of Reduction and Oxidation*, Lapitskii et al., Zhurnal Neorganischeskoi Khimii (Journal of Inorganic Chemistry, USSR), Vol. II, No. 1, 1957, pp. 80-91.
*The Influence of Gas Atmospheres on the First Stage Sintering of High Purity Niobium Powders*, Krehl et al., Metallurgical Transactions, vol. 15A, Jun. 1984, pp. 1111-1116.
*The Microstructure of Slightly Substoichiometric $NbO_1$*, Gannon et al, Journal of Solid State Chemistry, vol. 20, 1977, pp. 331-344.
*The Oxides Of Niobium*, Georg Bauer, Zeitschrift fuer anorganische und allgemeine Chemie, vol. 248, No. 1, Sep. 12, 1941, pp. 1-31.
*The Stabilization of Niobium-Based Solid Electrolyte Capacitors*, Qiu et al., Active and Passive Elec. Comp., vol. 25, 2002, pp. 201-209.
*The Use of Niobium as an Anode Material in Liquid Filled Electrolytic Capacitors*, Jackson et al., Electrocomponent Science and Technology, vol. 1, 1974, pp. 27-37.
*Transport and Noise Characteristics of Niobium Oxide and Tantalum Capacitors*, Sikula et al., 4 pages.
Catalog—Alfa Æsar—The Right Chemicals/The Right Chemistry, 1995-1996, 1 page.
Chapter entitled *The Lower Oxides of Columbium* by Mellor from A Comprehensive Treatise on Inorganic and Theoretical Chemistry, vol. IX, 1923, pp. 856-857.
Chemical Structure of gamma-Glycidoxypropyltrimethoxysilane from Si Power Chemical Corporation—SiSiB® Silane Coupling Agent, SiSiB® PC3100.
Form—Related U.S. Patent Applications.
Material Safety Data Sheet for Niobium Oxide, Jun. 1994, ESPI Metals.
Technical Report—*Niobium Solid Electrolytic Capacitors*, Mifune et al., National Technical Report 9, 1963, 17 pages.
Translation of SU 1,556,420 entitled *Material for Anodes of Electrolytic and Oxide-Semiconductor Capacitors*, by Yelyutin et al., Jul. 28, 1987.
Z. anorg. Allg. Chemie, vol. 317, 1962, pp. 321-333.
UK Search Report for GB0821005.6 dated Feb. 23, 2009, 4 pages.

* cited by examiner

SINTERED ANODE PELLET TREATED WITH A SURFACTANT FOR USE IN AN ELECTROLYTIC CAPACITOR

BACKGROUND OF THE INVENTION

Electrolytic capacitors are often formed from valve action materials that are capable of being oxidized to form a dielectric layer. Typical valve action metals are niobium and tantalum. More recently, capacitors have been developed that employ an anode made from an electrically conductive oxide of niobium and a niobium pentoxide dielectric. Niobium oxide based capacitors have significant advantages over tantalum capacitors. For example, niobium oxide is more widely available and potentially less expensive to process than tantalum. Niobium oxide capacitors are also more stable against further oxidation and thus less prone to thermal runaway when over-voltaged (or otherwise over-loaded) than tantalum and niobium. Further, niobium oxide has several orders of magnitude higher minimum ignition energy compared to niobium and tantalum. Niobium oxide capacitors may also have a unique high resistance failure mechanism that limits the leakage current to a level below the capacitor's thermal runaway point. The dielectric layer of these capacitors is mostly prepared by valve metal or NbO oxidation. The anodic oxidation at appropriate voltage has made valve metals oxides and may be performed by water electrolysis with oxygen generation. However, problems often arise due to the hydrophobicity of the oxides on the anode surface, which tend to repel water and create clusters. This may give rise to anodically grown dielectric films having an inhomogeneous and rough surface, which can lead to leakage current instability at accelerated temperature and voltage load.

As such, a need currently exists for an electrolytic capacitor anode having a reduced number of defects in the dielectric layer.

SUMMARY OF THE INVENTION

In accordance with one embodiment of the present invention, a method for forming an electrolytic capacitor anode is disclosed. The method comprises compacting a powder that contains a valve metal composition into a pressed pellet; sintering the pressed pellet to form an anode body; and anodically oxidizing the anode body in the presence of an electrolyte to form a dielectric layer. The electrolyte comprises an aqueous solvent and surfactant. The surfactant is anionic or nonionic and constitutes from about 0.01 wt. % to about 20 wt. % of the electrolyte.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Figure 1:
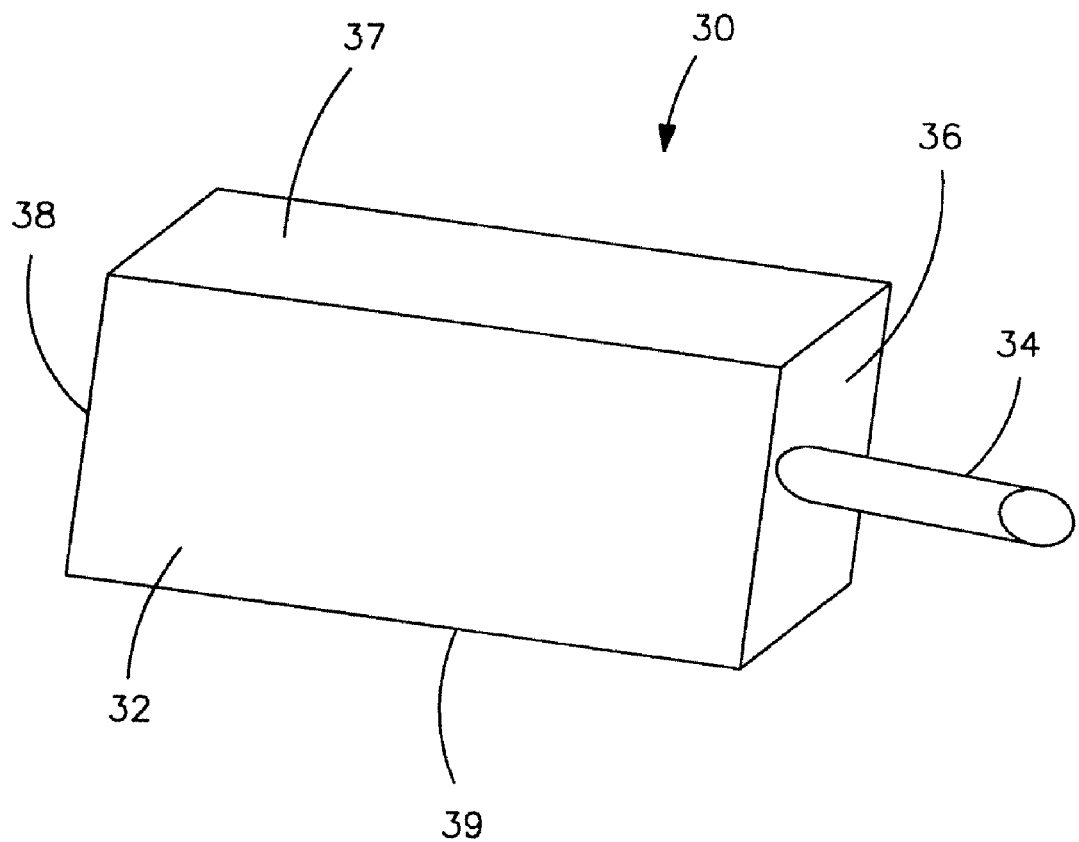
FIG. 1 is a perspective view of one embodiment of an electrolytic capacitor of the present invention.

Repeat use of references characters in the present specification and drawings is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to an electrolytic capacitor anode treated with a surfactant during anodic oxidation. Without intending to be limited by theory, it is believed that the surfactant may lower the surface tension of an electrolyte, which inhibits the clustering of grown oxides and allows the dielectric layer to become more homogeneous and uniformly spread over the anode body. The resulting dielectric layer may thus have a substantially homogeneous thickness, smooth surface, and improved leakage current stability.

The surfactant of the present invention may be ionic or nonionic in nature. Anionic surfactants, for instance, may be employed in the present invention, such as alkyl sulfates, alkyl aryl sulfates, alkyl ether sulfates, alkyl ether sulfonates, alkyl sulfonic acids, sulfate esters of an alkylphenoxy polyoxyethylene ethanol, α-olefin sulfonates, β-alkoxy alkane sulfonates, alkylauryl sulfonates, alkyl monoglyceride sulfates, alkyl monoglyceride sulfonates, alkyl carbonates, alkyl ether carboxylates, fatty acids, sulfonic acids, sulfosuccinates, sarcosinates, octoxynol or nonoxynol phosphates, taurates, fatty taurides, fatty acid amide polyoxyethylene sulfates, isethionates, derivatives and/or salts thereof, as well as mixtures of the foregoing. Particular examples of anionic surfactants include, but are not limited to, $C_8$-$C_{18}$ alkyl sulfates, $C_8$-$C_{18}$ fatty acid salts, $C_8$-$C_{18}$ alkyl ether sulfates having one or two moles of ethoxylation, $C_8$-$C_{18}$ alkamine oxides, $C_8$-$C_{18}$ alkoyl sarcosinates, $C_8$-$C_{18}$ sulfoacetates, $C_8$-$C_{18}$ sulfosuccinates, $C_8$-$C_{18}$ alkyl diphenyl oxide disulfonates, $C_8$-$C_{18}$ alkyl carbonates, $C_8$-$C_{18}$ alpha-olefin sulfonates, methyl ester sulfonates, and blends thereof. The $C_8$-$C_{18}$ alkyl group may be straight chain (e.g., lauryl) or branched (e.g., 2-ethylhexyl). The cation of the anionic surfactant may be a proton, alkali metal (e.g., sodium or potassium), ammonium, $C_1$-$C_4$ alkylammonium (e.g., mono-, di-, tri-), or $C_1$-$C_3$ alkanolammonium (e.g., mono-, di-, tri). More specifically, such anionic surfactants may include, but are not limited to, lauryl sulfates, octyl sulfates, 2-ethylhexyl sulfates, lauramine oxide, decyl sulfates, tridecyl sulfates, cocoates, lauroyl sarcosinates, lauryl sulfosuccinates, linear $C_{10}$ diphenyl oxide disulfonates, lauryl sulfosuccinates, lauryl ether sulfates (1 and 2 moles ethylene oxide), myristyl sulfates, oleates, stearates, tallates, ricinoleates, cetyl sulfates, and similar surfactants.

In some cases, conductivity and/or supporting electrolytes are used for appropriate anodic oxidation. In such instances, it may be desired that the surfactant is nonionic in nature to minimize the influence of the surfactant on the charge of the electrolyte. Examples of suitable nonionic surfactants include ethoxylated alkylphenols, ethoxylated and propoxylated fatty alcohols, ethylene oxide-propylene oxide block copolymers, ethoxylated esters of fatty ($C_8$-$C_{18}$) acids, condensation products of ethylene oxide with long chain amines or amides, condensation products of ethylene oxide with alcohols, acetylenic diols, and mixtures thereof. Various specific examples of suitable nonionic surfactants include, but are not limited to, methyl gluceth-10, PEG-20 methyl glucose distearate, PEG-20 methyl glucose sesquistearate, $C_{11-15}$ pareth-20, ceteth-8, ceteth-12, dodoxynol-12, laureth-15, PEG-20 castor oil, polysorbate 20, steareth-20, polyoxyethylene-10 cetyl ether, polyoxyethylene-10 stearyl ether, polyoxyethylene-20 cetyl ether, polyoxyethylene-10 oleyl ether, polyoxyethylene-20 oleyl ether, an ethoxylated nonylphenol, ethoxylated octylphenol, ethoxylated dodecylphenol, or ethoxylated fatty ($C_6$-$C_{22}$) alcohol, including 3 to 20 ethylene oxide moieties, polyoxyethylene-20 isohexadecyl ether, polyoxyethylene-23 glycerol laurate, polyoxyethylene-20 glyceryl stearate, PPG-10 methyl glucose ether, PPG-20 methyl glucose ether, polyoxyethylene-20 sorbitan monoesters, polyoxyethylene-80 castor oil, polyoxyethylene-15 tridecyl ether, polyoxyethylene-6 tridecyl ether, laureth-2, laureth-3, laureth-4, PEG-3 castor oil, PEG 600 dioleate, PEG 400 dioleate, and mixtures thereof. Commercially available nonionic surfactants may include the SURFYNOL® range of acetylenic diol surfactants available from Air Products and Chemicals of Allentown, Pa.; the TWEEN® range of polyoxyethylene surfactants available from Fisher Scientific of Pittsburgh, Pa.; and the TRITON® range of polyoxyethylene surfactants (e.g., TRITON® X-100, polyoxyethylene-10 isooctylcyclohexyl ether) available from Sigma-Aldrich Chemical Co. of St. Louis, Mo.

Polymeric nonionic surfactants may also be employed in certain embodiments that are soluble in the electrolyte. Examples of such polymers include, for instance, sodium, potassium and calcium alginates, carboxymethylcellulose, agar, gelatin, polyvinyl alcohol, collagen, pectin, chitin, chitosan, poly($\alpha$-amino acids), polyester, poly-1-caprolactone, polyvinylpyrrolidone, polyethylene glycol, polyethylene oxide, polyvinyl alcohol, polyether, polysaccharide, polyurethane, polyhydroxyacrylate, polymethacrylate, dextran, xanthan, hydroxypropyl cellulose, methyl cellulose, and homopolymers and copolymers of N-vinylpyrrolidone, N-vinyllactam, N-vinyl butyrolactam, N-vinyl caprolactam, other vinyl compounds having polar pendant groups, acrylate and methacrylate having hydrophilic esterifying groups, hydroxyacrylate, acrylic acid, and combinations thereof.

The anode is generally formed from a powder having a specific charge of about 25,000 microFarads*Volts per gram ("µF*V/g") or more, in some embodiments about 40,000 µF*V/g or more, in some embodiments about 60,000 µF*V/g or more, and in some embodiments, from about 80,000 to about 2000,000 µF*V/g or more. The powder contains a valve-metal composition that includes a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05. For example, the niobium oxide may be $NbO_{0.7}$, $NbO_{1.0}$, $NbO_{1.1}$, and $NbO_2$. In a preferred embodiment, the composition contains $NbO_{1.0}$, which is a conductive niobium oxide that may remain chemically stable even after sintering at high temperatures. Examples of such valve metal oxides are described in U.S. Pat. No. 6,322,912 to Fife; U.S. Pat. No. 6,391,275 to Fife et al.; U.S. Pat. No. 6,416,730 to Fife et al.; U.S. Pat. No. 6,527,937 to Fife; U.S. Pat. No. 6,576,099 to Kimmel, et al.; U.S. Pat. No. 6,592,740 to Fife, et al.; and U.S. Pat. No. 6,639,787 to Kimmel, et al.; and U.S. Pat. No. 7,220,397 to Kimmel, al., as well as U.S. Patent Application Publication Nos. 2005/0019581 to Schnitter; 2005/0103638 to Schnitter, et al.; 2005/0013765 to Thomas, et al., all of which are incorporated herein in their entirety by reference thereto for all purposes.

The particles used to form the powder may possess any desired shape or size. For example, the particles may be flaked, angular, nodular, and mixtures or variations thereof. The particles also typically have a screen size distribution of at least about 60 mesh, in some embodiments from about 60 to about 325 mesh, and in some embodiments, from about 100 to about 200 mesh. Further, the specific surface area is from about 0.1 to about 10.0 $m^2/g$, in some embodiments from about 0.5 to about 5.0 $m^2/g$, and in some embodiments, from about 1.0 to about 2.0 $m^2/g$. The term "specific surface area" refers to the surface area determined by the physical gas adsorption (B.E.T.) method of Bruanauer, Emmet, and Teller, Journal of American Chemical Society, Vol. 60, 1938, p. 309, with nitrogen as the adsorption gas. Likewise, the bulk (or Scott) density is typically from about 0.1 to about 5.0 grams per cubic centimeter ($g/cm^3$), in some embodiments from about 0.2 to about 2.5 $g/cm^3$, and in some embodiments, from about 0.5 to about 1.5 $g/cm^3$.

To facilitate formation of the anode, other components may be added to the electrically conductive particles. For example, the electrically conductive particles may be optionally mixed with a binder and/or lubricant to ensure that the particles adequately adhere to each other when pressed to form the anode body. Suitable binders may include camphor, stearic and other soapy fatty acids, Carbowax (Union Carbide), Glyptal (General Electric), polyvinyl alcohols, napthaline, vegetable wax, and microwaxes (purified paraffins). The binder may be dissolved and dispersed in a solvent. Exemplary solvents may include water, alcohols, and so forth. When utilized, the percentage of binders and/or lubricants may vary from about 0.1% to about 8% by weight of the total mass. It should be understood, however, that binders and lubricants are not required in the present invention.

Once formed, the resulting powder is compacted using any conventional powder press mold. For example, the press mold may be a single station compaction press using a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. The powder may be compacted around an anode wire (e.g., tantalum wire). It should be further appreciated that the anode wire may alternatively be attached (e.g., welded) to the anode body subsequent to pressing and/or sintering of the anode body. After compression, any binder/lubricant may be removed by heating the pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al., which is incorporated herein in its entirety by reference thereto for all purposes. Thereafter, the pellet is sintered to form a porous, integral mass. For example, in one embodiment, the pellet may be sintered at a temperature of from about 1200° C. to about 2000° C., and in some embodiments, from about 1500° C. to about 1800° C. under vacuum. Upon sintering, the pellet shrinks due to the growth of bonds between the particles. In addition to the techniques described above, any other technique for forming the anode body may also be utilized in accordance with the present invention, such as described in U.S. Pat. No. 4,085,435 to Galvagni; U.S. Pat. No. 4,945,452 to Sturmer, et al.; U.S. Pat. No. 5,198,968 to Galvagni; U.S. Pat. No. 5,357,399 to Salisbury; U.S. Pat. No. 5,394,295 to Galvagni, et al.; U.S. Pat. No. 5,495,386 to Kulkarni; and U.S. Pat. No. 6,322,912 to Fife, which are incorporated herein in their entirety by reference thereto for all purposes.

Although not required, the thickness of the anode may be selected to improve the electrical performance of the capacitor. For example, the thickness of the anode may be about 4 millimeters or less, in some embodiments, from about 0.2 to about 3 millimeters, and in some embodiments, from about 0.4 to about 1 millimeter. The shape of the anode may also be selected to improve the electrical properties of the resulting capacitor. For example, the anode may have a shape that is curved, sinusoidal, rectangular, U-shaped, V-shaped, etc. The anode may also have a "fluted" shape in that it contains one or more furrows, grooves, depressions, or indentations to increase the surface to volume ratio to minimize ESR and extend the frequency response of the capacitance. Such "fluted" anodes are described, for instance, in U.S. Pat. No. 6,191,936 to Webber, et al.; U.S. Pat. No. 5,949,639 to Maeda, et al.; and U.S. Pat. No. 3,345,545 to Bourgault et al., as well as U.S. Patent Application Publication No. 2005/0270725 to Hahn, et al., all of which are incorporated herein in their entirety by reference thereto for all purposes.

Once formed, the anode may be anodized so that a dielectric layer is formed over and/or within the anode. Anodization is an electrochemical process by which the anode is oxidized to form a material having a relatively high dielectric constant. For example, a niobium oxide (NbO) anode may be anodized to niobium pentoxide ($Nb_2O_5$). Typically, anodization is performed by initially applying an electrolyte to the anode, such as by dipping anode into the electrolyte. The electrolyte is generally in the form of a liquid, such as a solution (e.g., aqueous or non-aqueous), dispersion, melt, etc. A solvent is generally employed in the electrolyte, such as water (e.g., deionized water); ethers (e.g., diethyl ether and tetrahydrofuran); alcohols (e.g., methanol, ethanol, n-propanol, isopropanol, and butanol); triglycerides; ketones (e.g., acetone, methyl ethyl ketone, and methyl isobutyl ketone); esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); and so forth. The solvent may constitute from about 1 wt. % to about 99.9 wt. %, in some embodiments from about 20 wt. % to about 99 wt. %, and in some embodiments, from about 40 wt. % to about 95 wt. % of the electrolyte. Although not necessarily required, the use of an aqueous solvent (e.g., water) is often desired to facilitate formation of an oxide. In fact, water may constitute about 1 wt. % or more, in some embodiments about 10 wt. % or more, in some embodiments about 50 wt. % or more, in some embodiments about 70 wt. % or more, and in some embodiments, about 90 wt. % to 100 wt. % of the solvent(s) used in the electrolyte.

The electrolyte is electrically conductive and may have an electrical conductivity of about 1 milliSiemens per centimeter ("mS/cm") or more, in some embodiments about 30 mS/cm or more, and in some embodiments, from about 40 mS/cm to about 100 mS/cm, determined at a temperature of 25° C. To enhance the electrical conductivity of the electrolyte, a supporting electrolyte may be employed. Suitable ionic compounds for this purpose may include, for instance, acids, such as hydrochloric acid, nitric acid, sulfuric acid, phosphoric acid, polyphosphoric acid, boric acid, boronic acid, etc.; organic acids, including carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid, citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; sulfonic acids, such as methanesulfonic acid, benzenesulfonic acid, toluenesulfonic acid, trifluoromethanesulfonic acid, styrenesulfonic acid, naphthalene disulfonic acid, hydroxybenzenesulfonic acid, dodecylsulfonic acid, dodecylbenzenesulfonic acid, etc.; polymeric acids, such as poly(acrylic) or poly(methacrylic)acid and copolymers thereof (e.g., maleic-acrylic, sulfonic-acrylic, and styrene-acrylic copolymers), carageenic acid, carboxymethyl cellulose, alginic acid, etc.; and so forth. The concentration of ionic compounds is selected to achieve the desired electrical conductivity. For example, an acid (e.g., phosphoric acid) may constitute from about 0.01 wt. % to about 50 wt. %, in some embodiments from about 0.05 wt. % to about 20 wt. %, and in some embodiments, from about 0.1 wt. % to about 10 wt. % of the electrolyte. If desired, blends of ionic compounds may also be employed in the electrolyte.

The surfactant of the present invention is also present in the electrolyte to ensure that it is able to adequately reduce its surface tension and thereby increase the homogeneity of the resulting dielectric layer. When incorporated into the electrolyte, the surfactant is typically present in an amount of from about 0.01 to about 20 wt. %, in some embodiments from about 0.1 to about 10 wt. %, and in some embodiments, from about 0.5 to about 5 wt. % of the electrolyte. Of course, it should be understood that other techniques may also be employed for oxidation to create the dielectric layer.

A current is passed through the electrolyte to form the dielectric layer. The value of voltage manages the passed charge (current multiplied by time) and thereby the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the surface of the anode. Of course, other known methods may also be employed, such as pulse methods. The voltage typically ranges from about 4 to about 200 V, and in some embodiments, from about 9 to about 100 V. During anodic oxidation, the electrolyte can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be synthesized on a surface of the anode and/or within its pores.

Once the dielectric layer is formed, a protective coating may optionally be applied, such as one made of a relatively insulative resinous material (natural or synthetic). Such materials may have a specific resistivity of greater than about 0.05 ohm-cm, in some embodiments greater than about 5, in some embodiments greater than about 1,000 ohm-cm, in some embodiments greater than about $1 \times 10^5$ ohm-cm, and in some embodiments, greater than about $1 \times 10^{10}$ ohm-cm. Some resinous materials that may be utilized in the present invention include, but are not limited to, polyurethane, polystyrene, esters of unsaturated or saturated fatty acids (e.g., glycerides), and so forth. For instance, suitable esters of fatty acids include, but are not limited to, esters of lauric acid, myristic acid, palmitic acid, stearic acid, eleostearic acid, oleic acid, linoleic acid, linolenic acid, aleuritic acid, shellolic acid, and so forth. These esters of fatty acids have been found particularly useful when used in relatively complex combinations to form a "drying oil", which allows the resulting film to rapidly polymerize into a stable layer. Such drying oils may include mono-, di-, and/or tri-glycerides, which have a glycerol backbone with one, two, and three, respectively, fatty acyl residues that are esterified. For instance, some suitable drying oils that may be used include, but are not limited to, olive oil, linseed oil, castor oil, tung oil, soybean oil, and shellac. These and other protective coating materials are described in more detail U.S. Pat. No. 6,674,635 to Fife, et al., which is incorporated herein in its entirety by reference thereto for all purposes.

The anodized part is thereafter subjected to a step for forming cathodes according to conventional techniques. In some embodiments, for example, the cathode is formed by various techniques, such as pyrolytic decomposition of manganese nitrate ($Mn(NO_3)_2$) to form a manganese dioxide ($MnO_2$) cathode. Such techniques are described, for instance, in U.S. Pat. No. 4,945,452 to Sturmer, et al., which is incorporated herein in its entirety by reference thereto for all purposes. Alternatively, a conductive polymer coating may be used to form the cathode of the capacitor. The conductive polymer coating may contain one or more polyheterocycles (e.g., polypyrroles; polythiophenes, poly(3,4-ethylenedioxythiophene) (PEDT); polyanilines); polyacetylenes; poly-p-phenylenes; polyphenolates; and derivatives thereof. Moreover, if desired, the conductive polymer coating may also be formed from multiple conductive polymer layers. For example, in one embodiment, the conductive polymer coating may contain one layer formed from PEDT and another layer formed from a polypyrrole. Various methods may be utilized to apply the conductive polymer coating onto the anode part. For instance, conventional techniques such as electropolymerization, screen-printing, dipping, electrophoretic coating, and spraying, may be used to form a conductive polymer coating. In one embodiment, for example, the monomer(s) used to form the conductive polymer (e.g., 3,4-ethylenedioxythiophene) may initially be mixed with a polymerization catalyst to form a solution. For example, one suitable polymerization catalyst is BAYTRON C, which is iron III toluenesulfonate and sold by H.C. Starck. BAYTRON C is a commercially available catalyst for BAYTRON M, which is 3,4-ethylenedioxythiophene, a PEDT monomer also sold by H.C. Starck. Once a catalyst dispersion is formed, the anode part may then be dipped into the dispersion so that the polymer forms on the surface of the anode part. Alternatively, the catalyst and monomer(s) may also be applied separately to the anode part. In one embodiment, for example, the catalyst may be dissolved in a solvent (e.g., butanol) and then applied to the anode part as a dipping solution. The anode part may then be dried to remove the solvent therefrom. Thereafter, the anode part may be dipped into a solution containing the appropriate monomer. Once the monomer contacts the surface of the anode part containing the catalyst, it chemically polymerizes thereon. In addition, the catalyst (e.g., BAYTRON C) may also be mixed with the material(s) used to form the optional protective coating (e.g., resinous materials). In such instances, the anode part may then be dipped into a solution containing the monomer (BAYTRON M). As a result, the monomer can contact the catalyst within and/or on the surface of the protective coating and react therewith to form the conductive polymer coating. Although various methods have been described above, it should be understood that any other method for applying the conductive coating(s) to the anode part may also be utilized in the present invention. For example, other methods for applying such conductive polymer coating(s) may be described in U.S. Pat. No. 5,457,862 to Sakata, et al., U.S. Pat. No. 5,473,503 to Sakata, et al., U.S. Pat. No. 5,729,428 to Sakata, et al., and U.S. Pat. No. 5,812,367 to Kudoh, et al., which are incorporated herein in their entirety by reference thereto for all purposes.

In most embodiments, once applied, the conductive polymer is healed. Healing may occur after each application of a conductive polymer layer or may occur after the application of the entire conductive polymer coating. In some embodiments, for example, the conductive polymer may be healed by dipping the pellet into an electrolyte solution, such as a solution of phosphoric acid and/or sulfuric acid, and thereafter applying a constant voltage to the solution until the current is reduced to a preselected level. If desired, such healing may be accomplished in multiple steps. For instance, in one embodiment, a pellet having a conductive polymer coating is first dipped in phosphoric acid and applied with about 20 volts and then dipped in sulfuric acid and applied with about 2 volts. In this embodiment, the use of the second low voltage sulfuric acid solution or toluenesulphonic acid can help increase capacitance and reduce the dissipation factor (DF) of the resulting capacitor. After application of some or all of the layers described above, the pellet may then be washed if desired to remove various byproducts, excess catalysts, and so forth. Further, in some instances, drying may be utilized after some or all of the dipping operations described above. For example, drying may be desired after applying the catalyst and/or after washing the pellet in order to open the pores of the pellet so that it can receive a liquid during subsequent dipping steps.

Once the cathode is formed, the part may optionally be applied with a carbon layer (e.g., graphite) and silver layer, respectively. The silver coating may, for instance, act as a solderable conductor, contact layer, and/or charge collector for the capacitor element and the carbon coating may limit contact of the silver coating with the solid electrolyte. Such coatings may cover some or all of the solid electrolyte.

Figure 2:
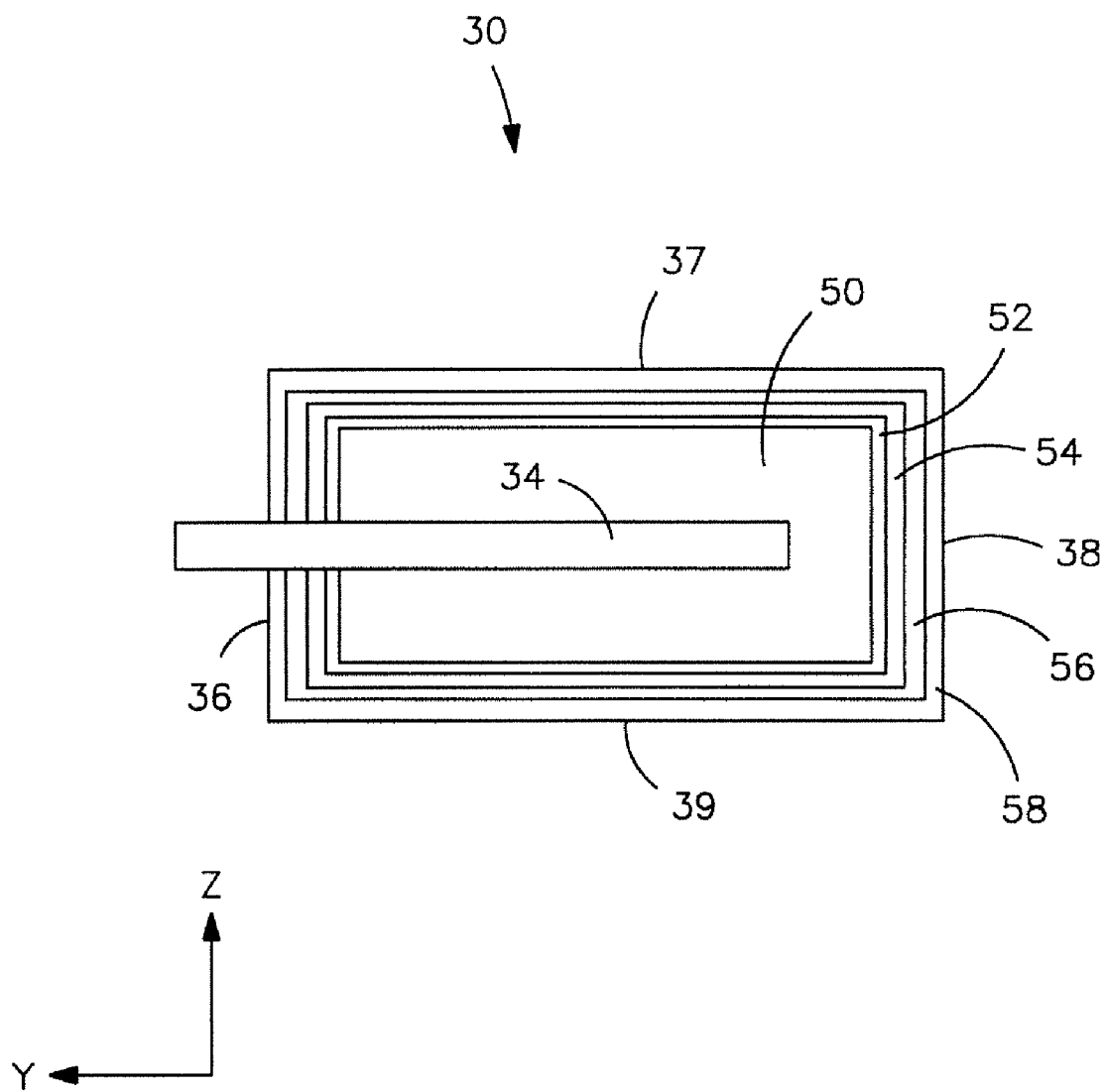
FIG. 2 is a cross-sectional view of the capacitor of FIG. 1.

The resulting capacitor element may then be terminated using techniques known in the art. Referring to FIGS. 1-2, for example, one embodiment of a capacitor element 30 is shown that has a generally rectangular shape and contains a front surface 36, rear surface 38, top and bottom surfaces 37 and 39, respectively, and side surfaces 32 (only one of which is illustrated). An anode wire 34 extends from the front surface 36 of the capacitor element 30 in a longitudinal direction ("y" direction). As further shown in FIG. 2, the capacitor element 30 contains an anode body 50, a dielectric layer 52 overlying the anode body 50, a solid electrolyte layer 54 overlying the dielectric layer 52, a graphite layer 56 overlying the organic solid electrolyte layer 54, and a silver layer 58 overlying the graphite layer 56. Of course, it should be understood that such layers may be applied to any surface of the capacitor, and need not be applied in the manner illustrated.

Figure 3:
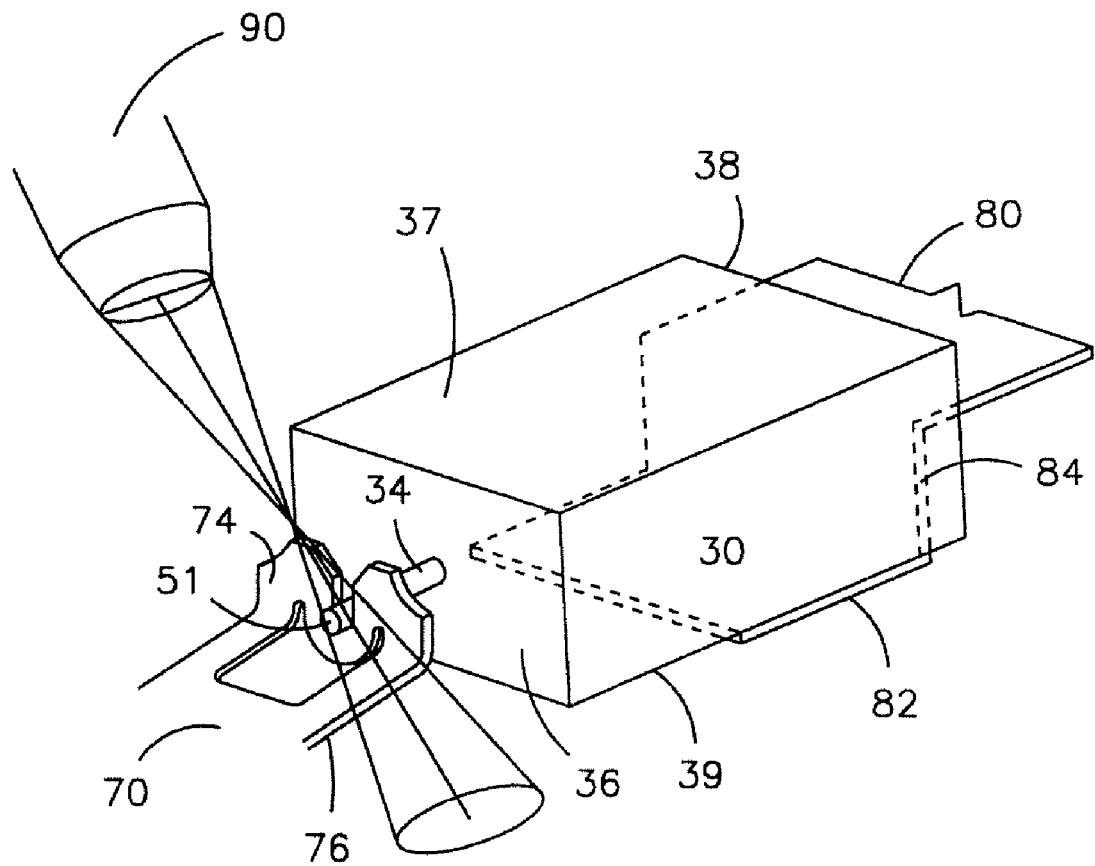
FIG. 3 is a schematic illustration of one embodiment of the present invention for laser welding a capacitor to an anode termination.

Upon formation of the capacitor element 30, anode and cathode termination may be electrically connected to the anode wire 34 and the solid electrolyte layer 54 (via the graphite and silver layers), respectively. The specific configuration of the terminations may vary as is well known in the art. Referring to FIG. 3, for example, one embodiment is shown that includes an anode termination 70 and a cathode termination 80. In this particular embodiment, the cathode termination contains a first portion 82 positioned substantially perpendicular to a second portion 84. The first portion 82 is in electrical contact with the lower surface 39 of the capacitor element 30 and the second portion 84 is in electrical contact with the rear surface 38 of the capacitor element 30. To attach the capacitor element 30 to the cathode termination 80, a conductive adhesive may be employed as is known in the art. The conductive adhesive may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives are described in U.S. Patent Application Publication No. 2006/0038304 to Osako, et al., which is incorporated herein in its entirety by reference thereto for all purposes.

Figure 4:
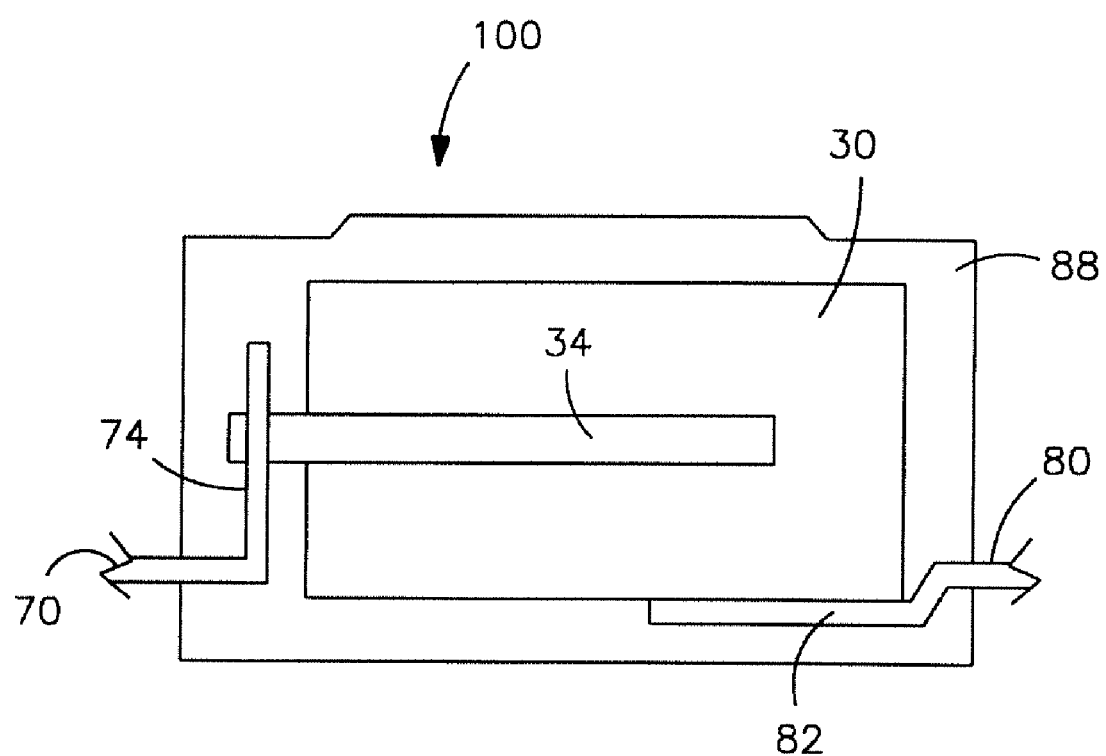
FIG. 4 is a cross-sectional view of a laser welded capacitor formed in accordance with one embodiment of the present invention.

The anode termination 70 contains a first portion 76 positioned substantially perpendicular to a second portion 74. The second portion 74 contains a region that carries the anode wire 34. In the illustrated embodiment, the region 51 possesses a "U-shape" for further enhancing surface contact and mechanical stability of the wire 34. The anode wire 34 is then welded to the region 51 with a laser 90. Once the capacitor element is attached to the terminations, it is enclosed within a resin casing, which may then be filled with silica-containing resin or any other known encapsulating material. The width and length of the case may vary depending on the intended application. However, the overall thickness of the casing is typically small so that the resultant assembly may be readily incorporated into low profile products (e.g., "IC cards"). For example, the thickness of the casing may range from about 4.0 millimeters or less, in some embodiments, from about 0.1 to about 2.5 millimeters, and in some embodiments, from about 0.15 to about 2.0 millimeters. Suitable casings may include, for instance, "A", "B", "H", or "T" cases (AVX Corporation). Referring to FIG. 4, for example, one particular embodiment of such an encapsulating case for a capacitor assembly 100 is shown as element 88. The encapsulating case 88 provides additional structural and thermal protection for the capacitor assembly 100. After encapsulation, exposed portions of the respective anode and cathode terminations may be aged, screened, and trimmed. If desired, the exposed portions may be optionally bent twice along the outside of the casing 88 (e.g., at an approximately 90° angle).

As a result of the present invention, a capacitor may be formed that exhibits excellent electrical properties. For example, the capacitor of the present invention typically has an ESR less than about 1000 milliohms (mohms), in some embodiments less than about 500 mohms, and in some embodiments, less than about 100 mohms. The equivalent series resistance of a capacitor generally refers to the extent that the capacitor acts like a resistor when charging and discharging in an electronic circuit and is usually expressed as a resistance in series with the capacitor. In addition, the resulting leakage current, which generally refers to the current flowing from one conductor to an adjacent conductor through an insulator, can be maintained at relatively low levels. For example, the numerical value of the normalized leakage current of a capacitor of the present invention is, in some embodiments, less than about 0.1 $\mu A/\mu F*V$, in some embodiments less than about 0.01 $\mu A/\mu F*V$, and in some embodiments, less than about 0.001 $\mu A/\mu F*V$, wherein $\mu A$ is microamps and uF*V is the product of the capacitance and the rated voltage. Likewise, the breakdown voltage of the capacitor of the present invention may be at least about 10 volts, in some embodiments at least about 15 volts, in some embodiments at least about 20 volts, and in some embodiments, from about 20 volts to about 100 volts.

The present invention may be better understood by reference to the following examples.

Test Procedures

Reflow/Pressure Cooker/Reflow Stability

To test the current stability at high temperatures, the anodes were heated according to a reflow temperature profile (preheat at a max of 180° C., peak of 250° C. to 255° C., and a reflow gradient of 3.75 to 4.25° C. per second) using the reflow oven Heller and in a pressure cooker (120° C., 100% humidity). More specifically, the anodes were first heated according to the reflow profile, then heated in the pressure cooker for 2 hours, and finally heated according to the reflow profile once again. The leakage current was measured using power supply Hewlett Packard H P6634A and MC157 Leakage test set made by Mantracourt Electronics LTD, UK, before and after the whole procedure at ambient temperature 25° C. after 20 seconds.

EXAMPLE 1

Figure 5:
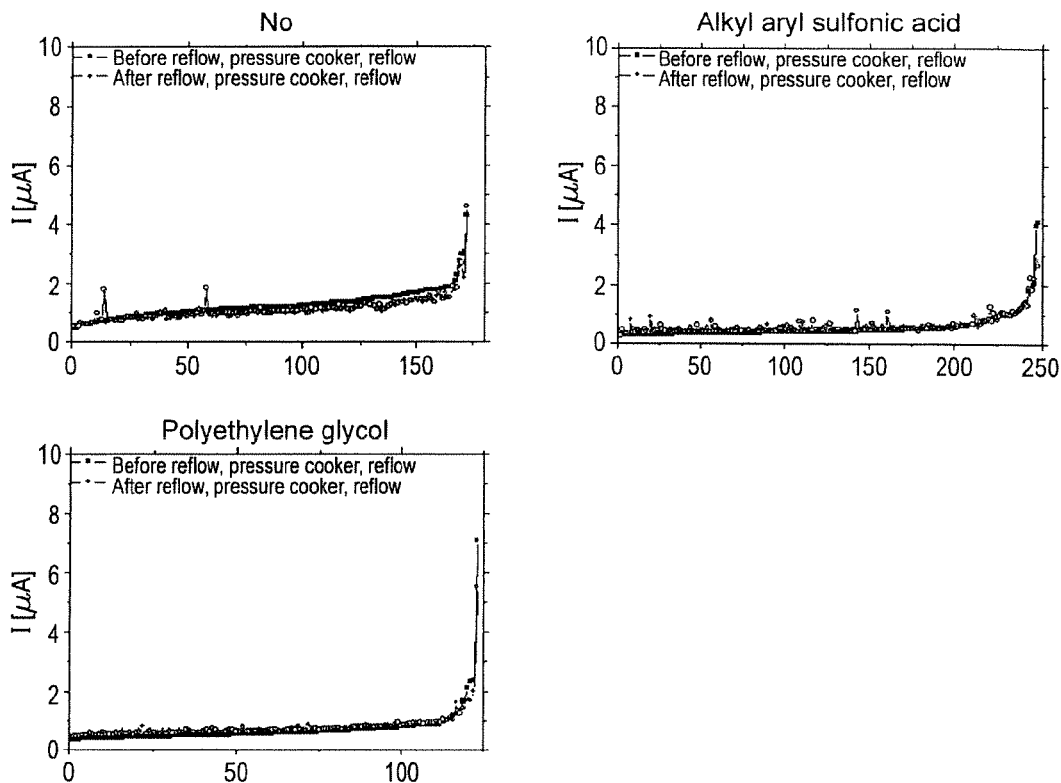
FIG. 5 is a graphical depiction of the leakage currently stability achieved for the samples of Example 1.

80,000 $\mu FV/g$ niobium oxide powder (HC Starck) was pressed into pellets and sintered to form a porous electrode body. Anodic oxidation was then carried out in an aqueous solution containing phosphoric acid or alkyl aryl sulfonic acid as a supporting electrolyte and phosphoric acid with 1% polyethylene glycol at ambient temperature. The anodic oxidation was done first galvanostatically to the desired voltage and than potentiostatically. The conductivity of the electrolyte with supporting electrolyte was 4.5 mS/cm. The voltage was chosen to obtain a targeted capacitance of 100 µF. After anodic oxidation, the pellets were coated with a manganese dioxide layer, a graphite coating and a silver coating. The finished parts were completed by conventional assembly technology to the B case (EIA 3528). The reflow/pressure cooker/reflow DCL stability was then tested. The results are shown in FIG. 5.

EXAMPLE 2

Figure 6:
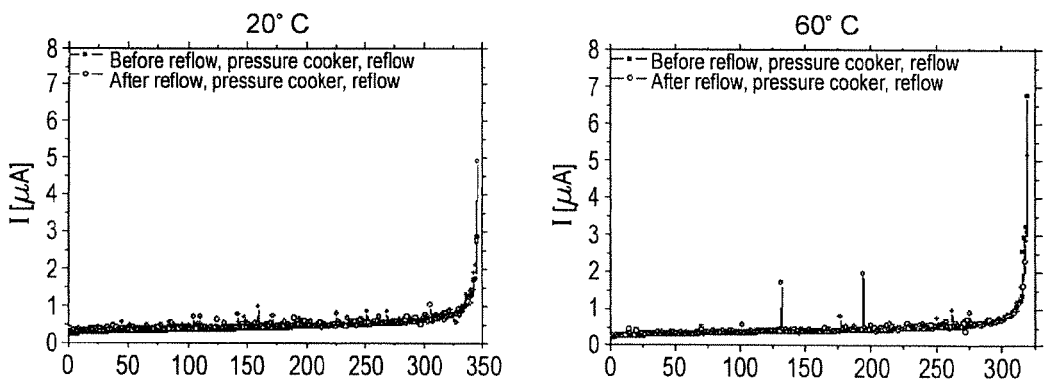
FIG. 6 is a graphical depiction of the leakage currently stability achieved for the samples of Example 2.

80,000 $\mu FV/g$ niobium oxide powder (HC Starck) was pressed into pellets and sintered to form a porous electrode body. Anodic oxidation was then carried out in an aqueous solution containing alkyl aryl sulfonic acid as a supporting electrolyte at different temperatures. After anodic oxidation, the pellets were coated with a manganese dioxide layer, a graphite coating, and a silver coating. The finished parts were completed by conventional assembly technology to the B case (EIA 3528). The anodes were then heated and tested as described in Example 1. The results are shown in FIG. 6.

EXAMPLE 3

Figure 7:
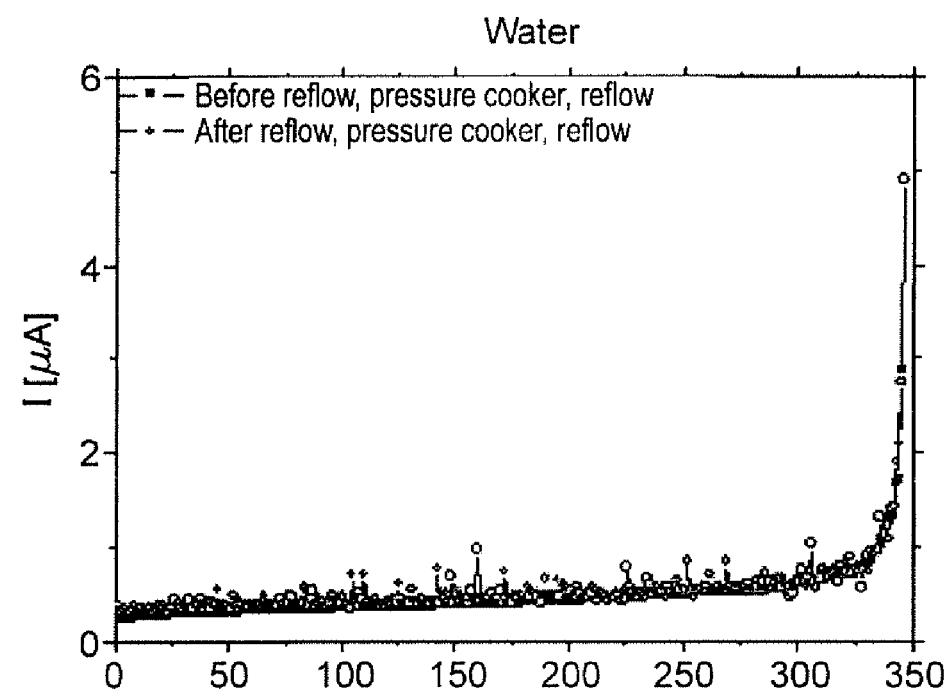
FIG. 7 is a graphical depiction of the leakage currently stability achieved for the samples of Example 3.
Figure 7:
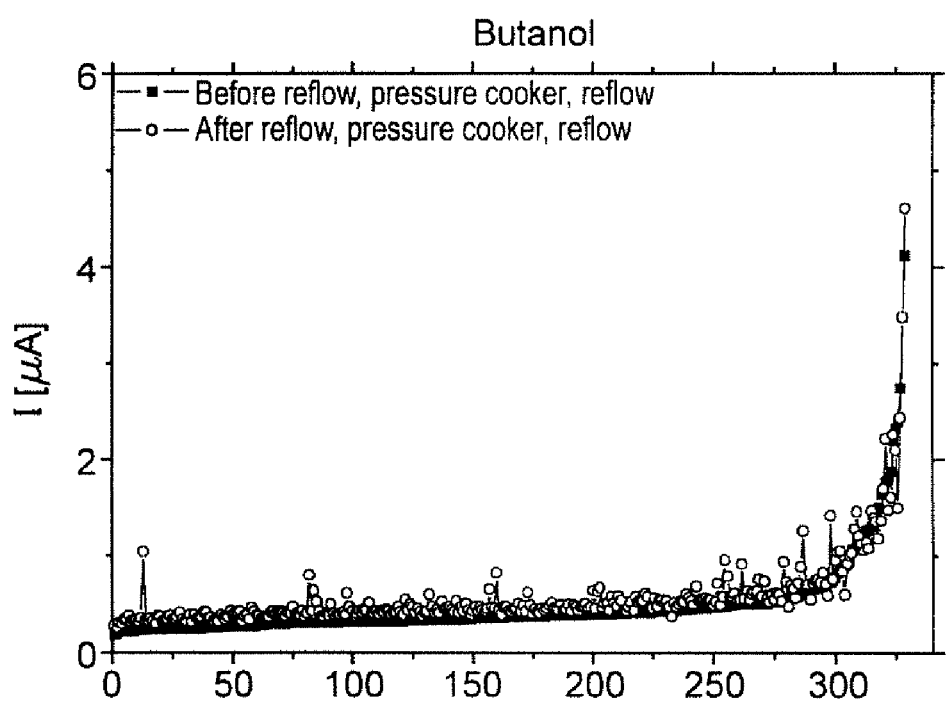

80,000 $\mu FV/g$ niobium oxide powder (HC Starck) was pressed into pellets and sintered to form a porous electrode body. Anodic oxidation was then carried out in an solution containing alkyl aryl sulfonic acid as a supporting electrolyte at ambient temperature in different solvents. After anodic oxidation, the pellets were coated with a manganese dioxide layer, a graphite coating and a silver coating. The finished parts were completed by conventional assembly technology to the B case (EIA 3528). The anodes were then heated and tested as described in Example 1. The results are shown in FIG. 7.

EXAMPLE 4

Figure 8:
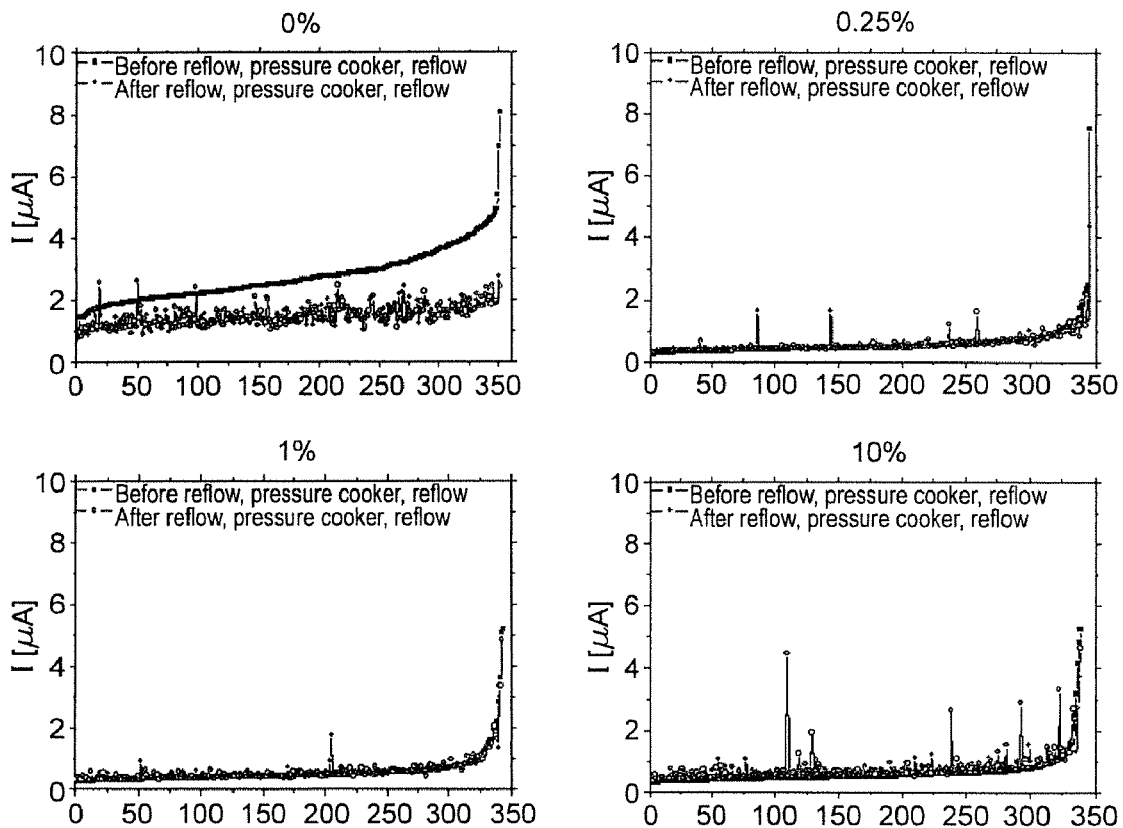
FIG. 8 is a graphical depiction of the leakage currently stability achieved for the samples of Example 4.

80,000 μFV/g niobium oxide powder (HC Starck) was pressed into pellets and sintered to form a porous electrode body. Anodic oxidation was then carried out in an aqueous solution containing different concentration of alkyl aryl sulfonic acid as a supporting electrolyte at ambient temperature. After anodic oxidation, the pellets were coated with a manganese dioxide layer, a graphite coating and a silver coating. The finished parts were completed by conventional assembly technology to the B case (EIA 3528). The anodes were then heated and tested as described in Example 1. The results are shown in FIG. 8.

EXAMPLE 5

Figure 9:
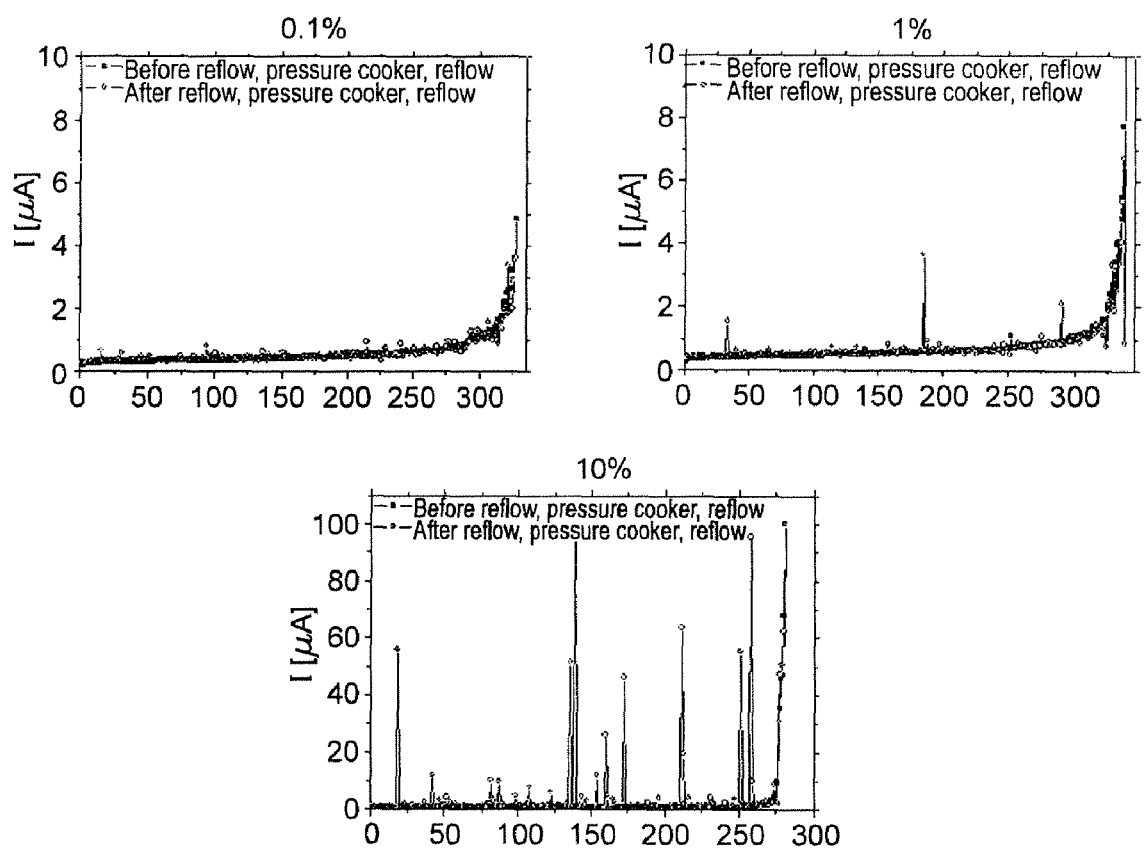
FIG. 9 is a graphical depiction of the leakage currently stability achieved for the samples of Example 5.

80,000 μFV/g niobium oxide powder (HC Starck) was pressed into pellets and sintered to form a porous electrode body. Anodic oxidation was then carried out in an aqueous solution containing alkyl aryl sulfonic acid as a supporting electrolyte and different polyethylene glycol concentrations at ambient temperature. After anodic oxidation, the pellets were coated with a manganese dioxide layer, a graphite coating, and a silver coating. The finished parts were completed by conventional assembly technology to the B case (EIA 3528). The anodes were then heated and tested as described in Example 1. The results are shown in FIG. 9.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A method for forming an electrolytic capacitor anode, the method comprising:
   compacting a powder that contains a valve metal composition into a pressed pellet, wherein the valve metal composition contains an electrically conductive oxide of tantalum or niobium;
   sintering the pressed pellet to form an anode body; and
   anodizing the anode body in the presence of an electrolyte to form a dielectric layer, wherein the electrolyte comprises a surfactant, wherein the surfactant is nonionic or anionic and constitutes from about 0.1 wt. % to about 10 wt. % of the electrolyte.

2. The method of claim 1, wherein the surfactant is anionic.

3. The method of claim 2, wherein the anionic surfactant is sulfonic acid, a derivative of sulfonic acid, a salt of sulfonic acid or a derivative of sulfonic acid, or a mixture of the foregoing.

4. The method of claim 2, wherein the anionic surfactant includes a lauryl sulfate, octyl sulfate, 2-ethylhexyl sulfate, lauramine oxide, decyl sulfate, tridecyl sulfate, cocoate, lauroyl sarcosinate, lauryl sulfosuccinate, linear $C_{10}$ diphenyl oxide disulfonate, lauryl sulfosuccinate, lauryl ether sulfate, myristyl sulfate, oleate, stearate, tallate, ricinoleate, cetyl sulfate, or a combination thereof.

5. The method of claim 2, wherein the anionic surfactant includes an alkyl aryl sulfonic acid.

6. The method of claim 1, wherein the surfactant is nonionic.

7. The method of claim 6, wherein the nonionic surfactant includes an ethoxylated alkylphenol, ethoxylated fatty alcohol, propoxylated fatty alcohol, ethylene oxide-propylene oxide block copolymer, ethoxylated esters of fatty ($C_8$-$C_{18}$) acid, condensation products of ethylene oxide with long chain amines or amide, condensation products of ethylene oxide with alcohol, acetylenic diol, or a combination thereof.

8. The method of claim 1, wherein the surfactant is a polymer.

9. The method of claim 8, wherein the polymer is polyethylene glycol.

10. The method of claim 8, wherein the polymer surfactant includes an alginate, carboxymethylcellulose, agar, gelatin, polyvinyl alcohol, collagen, pectin, chitin, chitosan, poly(α-amino acid), polyester, poly-1-caprolactone, polyvinylpyrrolidone, polyethylene glycol, polyethylene oxide, polyvinyl alcohol, polyether, polysaccharide, polyurethane, polyhydroxyacrylate, polymethacrylate, dextran, xanthan, hydroxypropyl cellulose, methyl cellulose, homopolymer of N-vinyl pyrrolidone, copolymer of N-vinylpyrrolidone, N-vinyllactam, N-vinyl butyrolactam, N-vinyl caprolactam, vinyl compound having a polar pendant group, acrylate or methacrylate having a hydrophilic esterifying group, hydroxyacrylate, acrylic acid, or a combination thereof.

11. The method of claim 8, wherein the polymer surfactant includes polyethylene glycol.

12. The method of claim 1, wherein the electrolyte further comprises an acid.

13. The method of claim 12, wherein the acid constitutes from about 0.01 wt. % to about 50 wt. % of the electrolyte.

14. The method of claim 12, wherein the acid constitutes from about 0.1 wt. % to about 10 wt. % of the electrolyte.

15. The method of claim 1, wherein the electrolyte comprises an aqueous solvent.

16. The method of claim 1, wherein the anode body is formed by compacting a powder to form a pressed pellet and sintering the pressed pellet.

17. The method of claim 1, wherein the anode body is dipped into the electrolyte.

18. The method of claim 1, wherein the valve metal composition contains an oxide of niobium having an atomic ratio of niobium to oxygen of 1:1.0 ±0.3.

19. The method of claim 1, wherein the valve metal composition contains an oxide of niobium having an atomic ratio of niobium to oxygen of 1:1.0 ±0.1.

20. A capacitor anode formed according to the method of claim 1.

21. A solid electrolytic capacitor comprising the capacitor anode of claim 20, further comprising a solid electrolyte layer overlying the dielectric layer.

22. The solid electrolytic capacitor of claim 21, further comprising at least additional layer that overlies the solid electrolyte layer, the additional layer including a carbon layer, silver layer, or a combination thereof.

23. The solid electrolytic capacitor of claim 22, further comprising an anode lead that extends from the anode body.

24. The solid electrolytic capacitor of claim 23, further comprising:
   a cathode termination that is in electrical communication with the solid electrolyte layer;
   an anode termination that is in electrical communication with the anode body; and a case that encapsulates the capacitor and leaves at least a portion of the anode and cathode terminations exposed.

25. The solid electrolytic capacitor of claim 21, wherein the solid electrolyte layer contains a conductive polymer.

26. The solid electrolytic capacitor of claim 21, wherein the solid electrolyte layer contains manganese dioxide.

27. The method of claim 1, wherein the anode body is anodized in the presence of a single electrolyte.

28. The method of claim 1, wherein the dielectric layer has a substantially homogeneous thickness.

29. The method of claim 1, wherein the powder has a specific charge of about 60,000 microFarads*Volts per gram or more.

30. The method of claim 1, wherein the surfactant constitutes from about 0.5 wt. % to about 5 wt. % of the electrolyte.

31. The solid electrolytic capacitor of claim 21, wherein the dielectric layer has a substantially homogeneous thickness.

* * * * *